United States Patent [19]
Takasu et al.

[11] Patent Number: 6,014,364
[45] Date of Patent: Jan. 11, 2000

[54] OPTICAL INFORMATION RECORDING MEDIUM AND METHOD OF MANUFACTURING

[75] Inventors: Akihiko Takasu, Tokyo; Kazuho Kato, Atsugi, both of Japan

[73] Assignee: Nippon Columbia Co., Ltd., Tokyo, Japan

[21] Appl. No.: 09/317,843

[22] Filed: May 25, 1999

Related U.S. Application Data

[63] Continuation of application No. 09/088,059, Jun. 1, 1998, which is a continuation of application No. 08/882,233, Jun. 25, 1997, Pat. No. 5,828,648, which is a continuation of application No. 08/576,751, Dec. 21, 1995, abandoned.

[30] Foreign Application Priority Data

May 17, 1995 [JP] Japan ...................................... 7-142642

[51] Int. Cl.$^7$ ....................................................... G11B 7/24
[52] U.S. Cl. ...................... 369/275.1; 369/286; 428/64.4
[58] Field of Search .............................. 369/275.1, 275.3, 369/94, 281, 286; 428/64.4, 64.1, 64.2; 430/320, 321

[56] References Cited

U.S. PATENT DOCUMENTS

| | | |
|---|---|---|
| 4,126,726 | 11/1978 | Soeding . |
| 4,219,704 | 8/1980 | Russel . |
| 4,441,179 | 4/1984 | Slaten . |
| 4,450,553 | 5/1984 | Holster et al. . |
| 4,905,215 | 2/1990 | Hattori et al. . |
| 4,908,813 | 3/1990 | Ojima et al. . |
| 5,097,464 | 3/1992 | Nishiuchi et al. . |
| 5,126,996 | 6/1992 | Iida et al. . |
| 5,134,604 | 7/1992 | Nagashima et al. . |
| 5,171,392 | 12/1992 | Iida et al. . |
| 5,263,011 | 11/1993 | Maeda et al. . |
| 5,303,225 | 4/1994 | Satoh et al. . |
| 5,381,401 | 1/1995 | Best et al. . |
| 5,428,597 | 6/1995 | Satoh et al. . |
| 5,446,565 | 8/1995 | Komma et al. . |
| 5,446,723 | 8/1995 | Best et al. . |
| 5,449,590 | 9/1995 | Imaino et al. . |
| 5,479,382 | 12/1995 | Nishida et al. . |
| 5,533,001 | 7/1996 | Watanabe et al. . |
| 5,540,966 | 7/1996 | Hintz . |
| 5,563,873 | 10/1996 | Ito et al. . |
| 5,608,715 | 3/1997 | Yokogawa et al. . |
| 5,625,609 | 4/1997 | Latta et al. . |
| 5,627,814 | 5/1997 | Lee . |
| 5,636,190 | 6/1997 | Choi . |
| 5,696,754 | 12/1997 | Nishizawa ............................ 369/275.1 |
| 5,764,619 | 6/1998 | Nishiuchi et al. ................... 369/275.1 |
| 5,862,121 | 1/1999 | Suzuki ................................. 369/275.1 |
| 5,878,018 | 3/1999 | Moriya et al. ....................... 369/275.1 |

FOREIGN PATENT DOCUMENTS

| | | |
|---|---|---|
| 3-157816 | 7/1991 | Japan . |
| 4-310655 | 11/1992 | Japan . |

*Primary Examiner*—Tan Dinh
*Attorney, Agent, or Firm*—Dickstein Shapiro Morin & Oshinsky LLP

[57] ABSTRACT

An optical information recording medium which can be played back by both a playback system for an SD (Superdensity Disk) and a playback system for an HDMCD (High Density Multimedia Compact Disk), or by both the playback system for the SD and a playback system for a CD (Compact Disk). The optical information recording medium comprises a first transparent substrate which includes a smooth surface, and a first information surface bearing pits correspondent to first recorded information, the first information surface being covered with a semitransparent film which transmits part of a playback beam and reflects part thereof; and a second transparent substrate which includes a smooth surface, and a second information surface bearing pits correspondent to second recorded information, the second information surface being covered with a reflective film which reflects the greater part of the playback beam; the second transparent substrate being stacked on the first transparent substrate with the first information surface of the latter overlaid by the smooth surface of the former.

18 Claims, 4 Drawing Sheets

OPTICAL INFORMATION RECORDING MEDIUM AND METHOD OF MANUFACTURING

This application is a continuation of application Ser. No. 09/088,059, filed Jun. 1, 1998, which is a continuation of application Ser. No. 08/882,233, filed Jun. 25, 1997, which issued as U.S. Pat. No. 5,828,648 on Oct. 27,1998 and is a continuation of application Ser. No. 08/576,751, filed Dec. 21,1995 (now abandoned).

BACKGROUND OF THE INVENTION

1. Field of the Invention

The present invention relates to an optical information recording medium from which information is played back by the use of a light beam.

2. Description of Related Art

A compact disk (CD) is a typical example of an optical disk in which minute recesses called "pits" and corresponding to recorded information are formed in one surface of a transparent substrate. The recorded information is played back in accordance with changes in the quantity of reflected light produced by focusing a laser beam on the pits through the transparent substrate.

More specifically, the CD is standardized so that trains of pits having the shortest pit length of about 0.9 ($\mu$m) are formed at a track pitch of 1.6 ($\mu$m) on the transparent substrate which has a diameter of 120 (mm) and a thickness of 1.2 (mm). The CD is played back at a constant linear velocity of about 1.3 (m/s), and it has a recording capacity of about 650 (MB). Digital data comprising music, a picture or the like are stored in the CD. In the ensuing explanation herein, the phrase a "format conforming to the CD standard" shall signify the above described specifications, and the term "CD" shall cover a CD-ROM (Compact Disk-Read Only Memory), or a Video-CD (Video-Compact Disk), etc.

On the other hand, research and development has been done on a digital video disk (DVD) which has a recording density which is about 6–8 times greater than a CD. At present, two design standards have been proposed as the DVD. One of the design standards is called an "SD" (Super-density Disk), and the other an "HDMCD" (High Density Multimedia Compact Disk). There is no interchangeability between both the design standards.

FIG. 3 is a model diagram showing the vertical sectional structure of the SD, while FIG. 4 is a model diagram showing the vertical sectional structure of the HDMCD.

As shown in FIG. 3, the SD is constructed so that a first transparent substrate 12, being 120 (mm) in diameter and 0.6 (mm) in thickness and formed with a first information surface 13, and a second transparent substrate 14, being 120 (mm) in diameter and 0.6 (mm) in thickness and formed with a second information surface 15 are adhered together by the use of an ultraviolet curing resin 16. The information surfaces 13 and 15 of the respective substrates 12 and 14 are located inside the first and second transparent substrates. The front or outer sides of the first information surface 13 and the second information surface 15 are respectively covered with reflective films. 17 made of a metal, such as aluminum, which reflects most of a laser beam. Recorded information items are played back from both the sides of the SD through the first transparent substrate 12 and the second transparent substrate 14.

An alternative SD construction has been proposed so that only the front or outer side of the first information surface 13 is covered with a semitransparent film made of a dielectric or the like instead of the reflective film 17. This alternative material is adapted to transmit part of the laser beam and to reflect the remainder thereof. As a consequence, both the information items recorded in the first information surface 13 and the second information surface 15 can be played back through the first transparent substrate 12.

The specifications of the SD presently proposed are a track pitch of 0.725 ($\mu$m), the shortest pit length of 0.4 ($\mu$m), a constant linear velocity of about 4 (m/s) in the playback mode, a storage capacity of about 10 (GB) using both information surfaces (13, 15), and a playback laser beam wavelength of either of 650 (nm) or 635 (nm). In the ensuing explanation herein, the phrase a "format conforming to the SD standard" shall signify the above described specifications.

On the other hand, as shown in FIG. 4, the HDMCD is constructed so that a transparent substrate 18 being 120 (mm) in diameter and 1.2 (mm) in thickness has two layers of information surfaces. The first information surface 19 is formed by injection molding, and the front or outer side thereof is covered with a semitransparent film 20 made of, e.g., a dielectric which transmits part of a laser beam and reflects the remainder. The second information surface 21 is formed so that an ultraviolet-curing resin 24, applied to a thickness of about 40 ($\mu$m) on the semitransparent film 20, is hardened by irradiation with ultraviolet light while being pressed down by a stamper. The front or outer side of the second information surface 21 is covered with a reflective film 22 made of a metal, such as aluminum, which reflects most of the laser beam. Further, the front or outer side of the reflective film 22 is covered with a protective film 23 which is made of an ultraviolet-curing resin or the like.

The specifications of the HDMCD presently proposed are a track pitch of 0.84 ($\mu$m), the shortest pit length of 0.451 ($\mu$m), a constant linear velocity of about 4 (m/s) in the playback mode of this HDMCD, a storage capacity of about 7.4 (GB), and a playback laser beam wavelength of 635 (nm). In the ensuing explanation herein, the phrase a "format conforming to the HDMCD standard" shall signify the above specifications.

As stated above, the optical disks SD, HDMCD and CD are based on different record formats. Moreover, the 5 thickness of each transparent substrate is 0.6 (mm) in the SD, whereas the thickness of the transparent substrate is 1.2 (mm) in the HDMCD and CD. When the disks having the transparent substrates of the different thicknesses are to be played back using an identical objective lens, aberrations appear on the information surface, and the playback laser beam spot cannot be narrowed down to the diffraction limit that the pit information can be read.

Accordingly, the optical information recording medium in which the information has been recorded in the format conforming to the SD standard cannot be played back by a playback system adapted to the HDMCD or the CD standards. Likewise, the optical information recording medium in which the information has been recorded in the format conforming to the HDMCD or CD standard cannot be played back by a playback system adapted to the SD standard.

SUMMARY OF THE INVENTION

The present invention has been made in order to solve the above problem, and has for its object to provide an optical information recording medium which can be played back by both a playback system adapted to an SD and an HDMCD standards, or by both the playback system adapted to the SD and a CD standards.

One aspect of the present invention involves an optical information recording medium which comprises a first transparent substrate which includes a smooth surface, and a first information surface bearing pits correspondent to first recorded information. The first information surface is covered with a semitransparent film which transmits part of a playback beam and reflects part thereof. The optical information recording medium further includes a second transparent substrate having a smooth surface, and a second information surface bearing pits correspondent to second recorded information, the second information surface being covered with a reflective film which reflects the greater part of the playback beam. The second transparent substrate is stacked (adhered by an adhesive layer or fixed by jig means) on the first transparent substrate with the first information surface of the latter overlaid by the smooth surface of the former.

The optical information recording medium defined above can be constructed so that the first transparent substrate and the second transparent substrate are each substantially 0.6 (mm) in thickness.

Besides, the optical information recording medium defined above can be constructed so that the first recorded information of the first information surface and the second recorded information of the second information surface have been recorded in different record formats.

In operation, the optical information recording medium as a single member can include information surfaces of two different standards, so that an optical information recording medium which can be played back by both the playback systems of the two different standards can be obtained. Besides, the first information surface is covered with the semitransparent film which transmits part of the playback beam and reflects part thereof, and the second information surface is covered with the reflective film which reflects the greater part of the playback beam, so that both the information recorded in the first information surface and the information recorded in the second information surface can be played back from one side of the optical information recording medium.

In the case where each of the transparent substrates is specified to be substantially 0.6 (mm) in thickness, a distance between the first information surface and a smooth surface of the first transparent substrate, which the playback laser beam incidents, is 0.6 (mm) and a distance between the second information surface and the smooth surface of the first transparent substrate is 1.2 (mm). As a consequence, the information recorded in the first information surface can be played back through the objective lens of a pickup for projecting the playback laser beam, in a playback system adapted to an optical information recording medium whose transparent substrate is about 0.6 (mm) in thickness. Moreover, and the information recorded in the second information surface can be played back through the objective lense of a pickup for projecting the playback laser beam in a playback system for an optical information recording medium whose transparent substrate is about 1.2 (mm) in thickness.

In the case where the different record formats are utilized, the optical information recording medium as the single member can be formed with two information surfaces in which the information items recorded in the different record formats are respectively contained.

PREFERRED EMBODIMENT OF THE INVENTION

Figure 1:
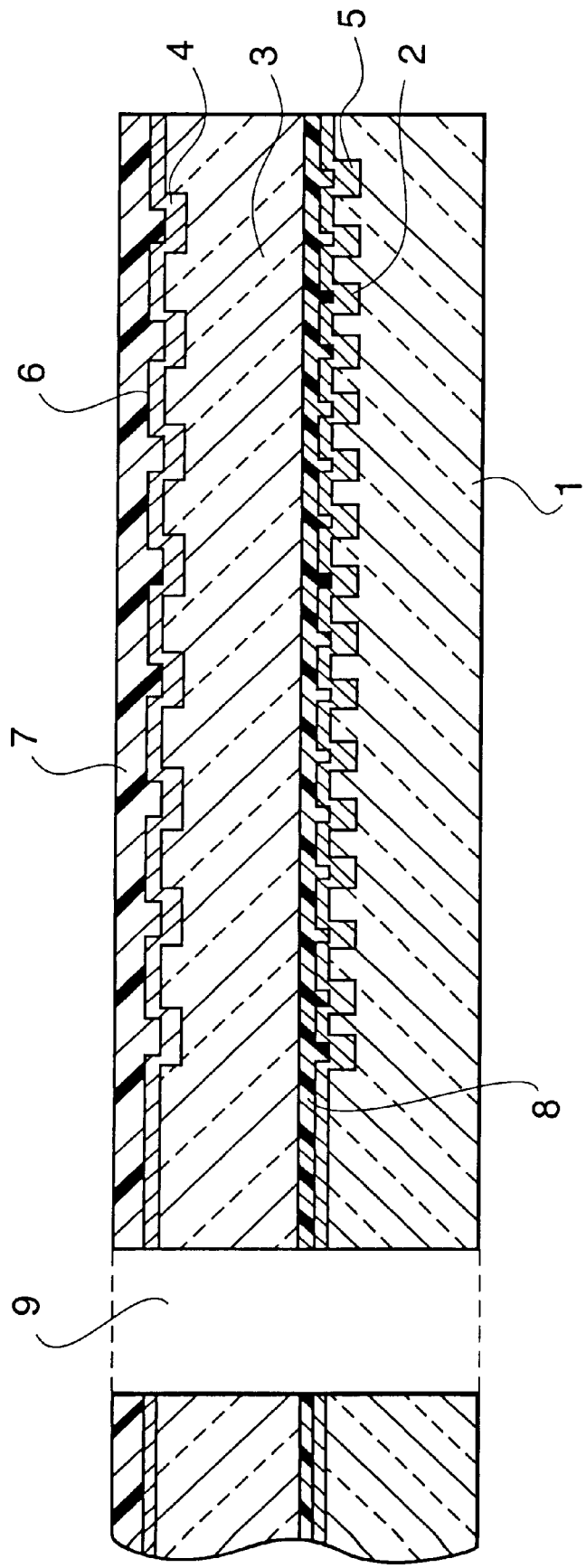
FIG. 1 is a model diagram showing the vertical sectional structure of an optical information recording medium according to the present invention.
Figure 2A:
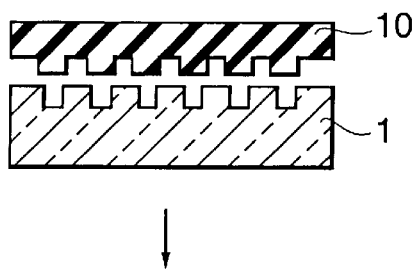
FIG. 2 is a schematic flow chart showing a method of manufacturing the optical information recording medium according to the present invention.
Figure 2C:
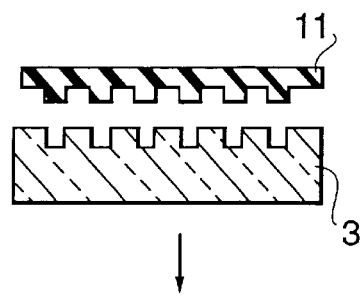
Figure 2B:
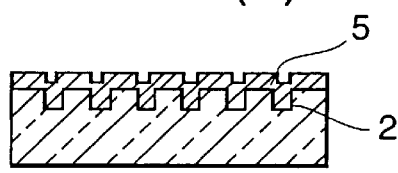
Figure 2D:
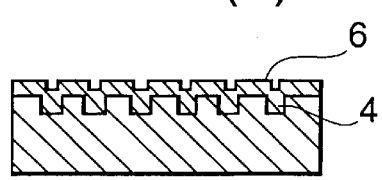
Figure 2E:
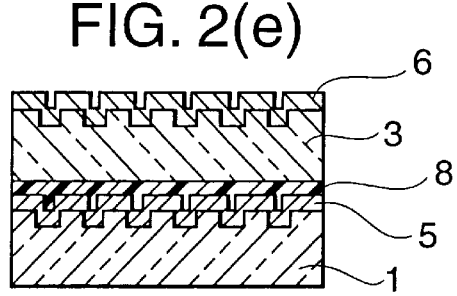
Figure 2F:
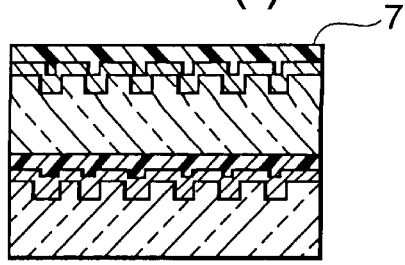
Figure 3:
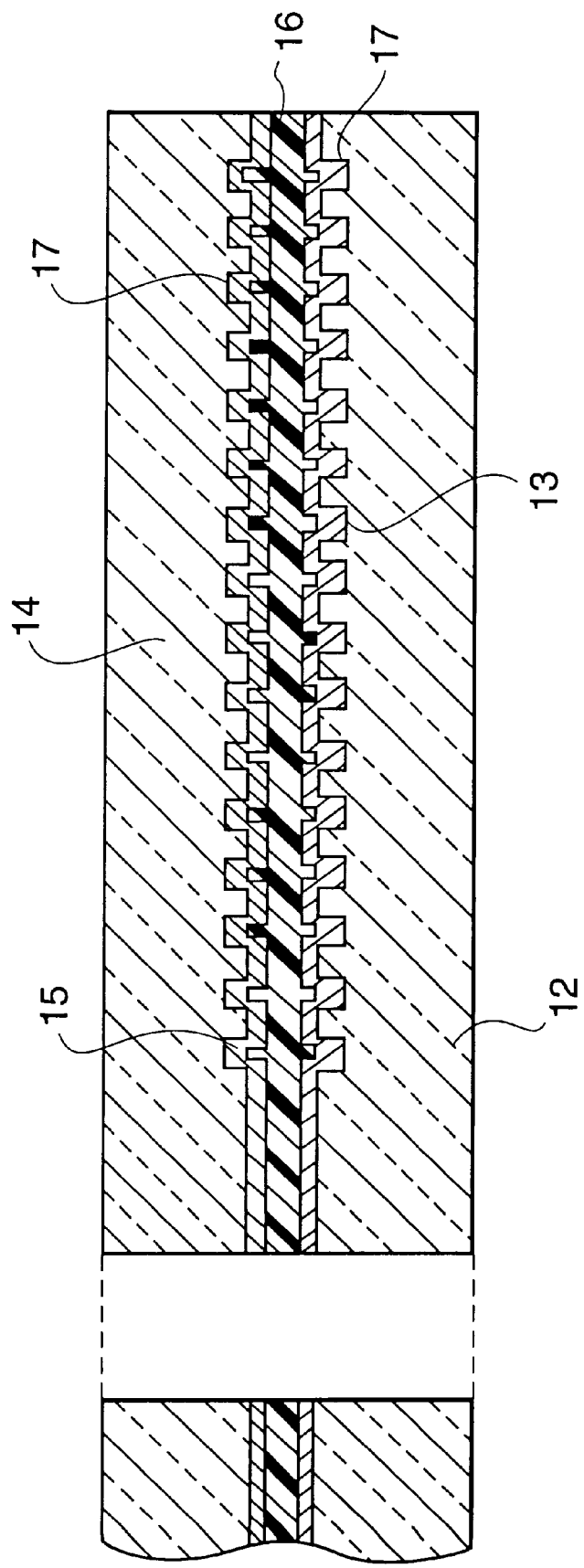
FIG. 3 is a model diagram of the vertical sectional structure of an SD in the prior art.

An optical information recording medium embodying the present invention will now be described in detail with reference to the accompanying drawings. FIG. 1 is a model diagram showing the preferred embodiment of the vertical sectional structure of the optical information recording medium. As shown in FIG. 1, a first transparent substrate 1 is 120 (mm) in diameter and 0.6 (mm) in thickness and has a center hole 9 which is 15 (mm) in diameter. The first transparent substrate is formed with a first information surface 2. A second transparent substrate 3 is 120 (mm) in diameter and 0.6 (mm) in thickness and has a center hole 9 which is 15 (mm) in diameter. The second transparent substrate is formed with a second information surface 4. The first transparent substrate 1 and the second transparent substrate 3 are adhered to each other through an adhesive layer 8 with the first information surface 2 of the former 1 overlain by the smooth surface of the latter 3.

Here, the front or outer side of the first information surface 2 is covered with a semitransparent film 5 which transmits part of a playback laser beam and reflects part thereof. On the other hand, the front or outer side of the second information surface 4 is covered with a reflective film 6 which reflects the greater part of the playback beam. Further, the front or outer side of the reflective film 6 is covered with a protective film 7.

The semitransparent film 5 is made of a dielectric such as ZnS (zinc sulfide), $Si_2N_3$ (silicon nitride) or AlN (aluminium nitride), or a metal such as Al (aluminum), Au (gold) or Ag (silver), which is formed so as to transmit part of a playback laser beam and reflect part thereof. In addition, the reflective layer 6 is made of the metal such as Al (aluminum), Au (gold) or Ag (silver), which is formed so as to reflect the greater part of the playback laser beam.

Since the thickness of the first transparent substrate 1 of the optical information recording medium of this embodiment is about 0.6 (mm), information recorded in the first information surface 2 can be read out by a playback system for an optical disk whose transparent substrate is 0.6 (mm) in thickness. That is, in a case where information is recorded in the first information surface 2 in conformity with the SD standard beforehand, the optical information recording medium can be played back by a playback system for an SD.

Moreover, the thickness of the second transparent substrate 3 of the optical information recording medium of this embodiment is about 0.6 (mm), and the thickness of the whole optical disk becomes about 1.2 (mm) when both the transparent substrates 1 and 3 have been adhered together. Therefore, the recorded information of the second information surface 4 can be read out by a playback system for an optical disk whose transparent substrate is 1.2 (mm) in thickness. That is, in the case where information is previously recorded in the second information surface 4 in the CD standard or HDMCD standard, the optical information recording medium of this embodiment can be played back by a playback system for a CD or a playback system for an HDMCD.

Thus, the optical information recording medium according to the present invention can be produced as one which is permitted to be played back by both the playback system adapted to the SD and CD standards, or as one which is permitted to be played back by both the playback system adapted to the SD and HDMCD standards.

Next, the practical applications of the optical information recording medium of the present invention will be described. In one example, the program of a movie or the like is recorded in the first information surface 2 in the format conforming to the SD standard (i.e. in accordance with the data compression method "MPEG2": Moving Picture coding Experts Group 2). Information is also recorded in the second information surface 4 in the format conforming to the Video-CD standard (i.e. in accordance with the data compression method "MPEG1": Moving Picture coding Experts Group 1). Thus, the single disk can be played back by both a playback system for a Video-CD as well as a playback system for the SD.

As another example, the program of a movie or the like is recorded in the first information surface 2 in the SD standard format, while the sound track of the movie or the like is recorded in the second information surface 4 in the CD standard format. Then, the optical information recording medium as a single disk can be-used both for enjoying the program of the movie or the like by the playback system for the SD and for enjoying the music of the sound track of the movie or the like by the playback system for the CD.

As still another example, the program of a movie or the like is recorded in the first information surface 2 in the format conforming to the SD standard, while it is recorded in the second information surface 4 in the format conforming to the HDMCD standard. Then, the optical 20 information recording medium as the single disk can be played back by both the playback system for the SD and the playback system for the HDMCD.

Now, a method of manufacturing the optical information recording medium according to the present invention will be described. FIG. 2 is a schematic,flow sheet showing the method of manufacturing the optical information recording medium according to the present invention (as depicted in FIG. 1).

First, as shown at a stage (a) in FIG. 2, a first transparent substrate 1, which is 120 (mm) in diameter and 0.6 (mm) in thickness and has a center hole (9 in FIG. 1) being 15 (mm) in diameter and which is made of a resin such as polycarbonate, is prepared by injection molding. Herein, a first stamper 10, which bears information recorded in the format conforming to the SD standard, is used for forming a first information surface 2.

Subsequently, as shown at a stage (b), a semitransparent film 5 made of a dielectric or metal is formed on the front or outer side of the first information surface 2 of the first transparent substrate 1 by sputtering or evaporating deposition. Herein, the semitransparent film 5 is formed so as to exhibit a reflectance of about 30 (%) for a playback laser beam having a wavelength of 650–680 (nm).

The manufacturing stages (c) and (d) may occur in parallel with stages (a) and (b) in FIG. 2. As shown at the stage (c), a second transparent substrate 3, which is 120 (mm) in diameter and 0.6 (mm) in thickness and has a center hole (9 in FIG. 1) being 15 (mm) in diameter and which is made of a resin such as polycarbonate, is prepared by the injection molding. Herein, a second stamper 11, which bears information recorded in the format conforming to the CD standard or HDMCD standard, is used for forming a second information surface 4.

Subsequently, as shown at the stage (d), a reflective layer 6 made of a metal is formed on the front or outer side of the second information surface 4 of the second transparent substrate 3 by sputtering or evaporating deposition. Herein, the reflective layer 6 is formed so as to exhibit a reflectance of at least 70 (%) for the playback laser beam having the wavelength of 650–680 (nm) in case of conforming to the HDMCD standard or a playback laser beam having a wavelength of 780 (nm) in case of conforming to the CD standard.

At the next stage (e), an adhesive layer 8 composed of an ultraviolet-curing resin or the like, which is several decades ($\mu$m) in thickness, is applied on the surface of the first transparent substrate 1 covered with the semitransparent layer 5, and the smooth surface of the second transparent substrate 3 is adhered to the aforementioned surface of the first transparent substrate 1 through the adhesive layer 8. Further, at stage (f), a protective layer 7 composed of an ultraviolet-curing resin or the like is formed on the front or outer side of the reflective layer 6. If necessary, the protective layer 7 may be printed on. Incidentally, the first transparent substrate 1 and the second transparent substrate 3 may be adhered together by a hot melting method or the like. It is also possible to omit the formation of the adhesive layer 8. As an example in this case, both the transparent substrates 1 and 3 may be fixed to each other by jigs, such as check pins, which are mounted on the outer peripheral parts and/or inner peripheral parts of the first transparent substrate 1 and second transparent substrate 3.

Figure 4:
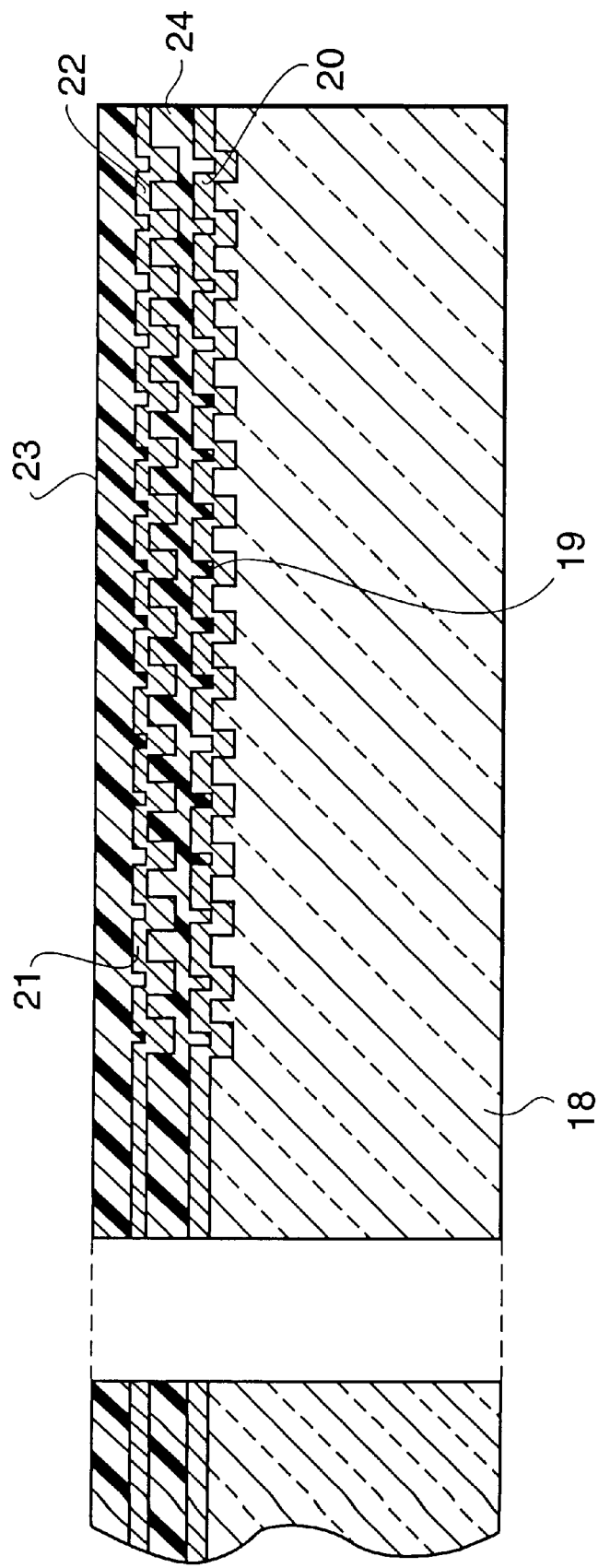
FIG. 4 is a model diagram of the vertical sectional structure of an HDMCD in the prior art.

Another effect of the optical information recording medium according to the present invention will be explained here. With the prior-art SD or HDMCD of the type which can be played back from one side of the disk;.as seen from FIG. 4, the distance between the first information surface 19 and the second information surface 21 is as slight as about 40 ($\mu$m). The slight distance has incurred unfavorable phenomena. By way of example, in the case where a disturbance, such as vibration, occurs during playback of the first information surface 19, a servo control will fail to focus the playback laser beam due to the disturbance. Consequently, the playback laser beam is focused on the second information surface 21, so that the playback of the 20 first information surface 19 is interrupted. The playback laser beam is easily unfocused especially from the first information surface 19, because this information surface is endowed with a reflectance of only about 30 (%) due to the semitransparent layer 20.

In contrast, as shown in FIG. 1, the distance between the first information surface 2 and second information surface 4 of the optical information recording medium of the present invention is as great as about 0.6 (mm) which is the thickness of the second transparent substrate 3. Therefore, even when disturbances occur, such as vibrations occur during playback of the first information surface 2, the phenomenon that the focal point of the playback laser beam shifts onto the second information surface 4 rarely takes place. The same also holds true for the reverse shift.

The optical information recording medium according to the present invention includes a further advantage. Since the distance between the first information surface 2 and the second information surface 4 is as great as about 0.6 (mm) as stated above, the playback laser beam for playing back the second information surface 4 falls on the first information surface 2 with a beam spot area that is larger than the prior-art SD or HDMCD. Therefore, the signal of the information in the first information surface 2 is superposed in a very small amount on the playback signal of the information in the second information surface 4. Consequently, the signal of the information in the first information surface 2 can be played back at a high S/N (signal-to-noise) ratio.

As described above, an optical information recording medium according to the present invention can be played back by both a playback system adapted to an SD and an HDMCD standards, or by both the playback system adapted to the SD and a CD standards.

What is claimed is:

1. A method of manufacturing an optical information recording medium comprising the steps of:

forming a first transparent substrate, the first transparent substrate having a first information surface and a first smooth surface, the first information surface being formed in a first format that is reproducible by a first playback beam having a first wavelength;

forming a second transparent substrate, the second transparent substrate having a second information surface and a second smooth surface, the second smooth surface being formed in a second format different from the first format and reproducible by a second playback beam having a second wavelength different from the first wavelength;

forming a partially reflective first layer on the first information surface that reflects a portion of the first playback beam and transmits a portion of the second playback beam;

forming a reflective second layer on the second information surface that reflects the majority of the second playback beam;

adhering the second transparent substrate to the first transparent substrate such that the first information surface faces the second smooth surface.

2. The method of claim 1, wherein the first layer is a film and the second layer is a film.

3. The method of claim 2, wherein the first layer is formed of a dielectric.

4. The method of claim 2, wherein the first layer is formed of a metal.

5. The method of claim 1, wherein the reflectance of the second layer is approximately 70 percent for the second playback beam.

6. The method of claim 1, wherein the reflectance of the first layer is approximately 30 percent for the first playback beam.

7. The method of claim 1, wherein the adhering step is performed by applying an ultraviolet-hardening resin between the first information surface and the second smooth surface and irradiating the resin with ultraviolet radiation.

8. The method of claim 1, wherein a recording density of the first information surface is higher than a recording density of the second information surface.

9. The method of claim 1, wherein a thickness of the first transparent substrate is approximately 0.6 millimeters.

10. The method of claim 1, wherein the thickness of the second transparent substrate is approximately 0.6 millimeters.

11. The method of claim 1, wherein the combined thicknesses of the first and second transparent substrates is approximately 1.2 millimeters.

12. The method of claim 1, wherein the first format conforms to a digital video disc specification.

13. The method of claim 1, wherein the second format conforms to a compact disc specification.

14. The method of claim 13, wherein the compact disc specification is the CD-ROM specification.

15. The method of claim 1, wherein the first wavelength is approximately 650–680 nanometers.

16. The method of claim 1, wherein the second wavelength is approximately 780 nanometers.

17. The method of claim 1, wherein information stored on the first information surface conforms to a data compression method in accordance with Moving Pictures Expert Group 2.

18. The method of claim 1, wherein information stored on the second information surface conforms to a data compression method in accordance with Moving Pictures Expert Group 1.

* * * * *